United States Patent
Neal et al.

(10) Patent No.: US 8,978,759 B2
(45) Date of Patent: Mar. 17, 2015

(54) ELECTROSTATIC PARTICULATE COATING METHODS AND APPARATUS FOR FRACTURING FLUIDS

(75) Inventors: Kenneth Gregory Neal, Duncan, OK (US); Philip D. Nguyen, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/597,178

(22) Filed: Aug. 28, 2012

(65) Prior Publication Data

US 2014/0060842 A1    Mar. 6, 2014

(51) Int. Cl.
*E21B 43/267* (2006.01)
*C09K 8/62* (2006.01)
*C09K 8/80* (2006.01)
*E21B 21/06* (2006.01)

(52) U.S. Cl.
CPC .............. *E21B 21/062* (2013.01); *C09K 8/62* (2013.01); *C09K 8/805* (2013.01)
USPC .................... 166/280.1; 166/308.1; 166/90.1

(58) Field of Classification Search
None
See application file for complete search history.

(56) References Cited

U.S. PATENT DOCUMENTS

| | | |
|---|---|---|
| 5,582,249 A | 12/1996 | Caveny et al. |
| 5,775,425 A | 7/1998 | Weaver et al. |
| 5,787,986 A | 8/1998 | Weaver et al. |
| 5,833,000 A | 11/1998 | Weaver et al. |
| 5,853,048 A | 12/1998 | Weaver et al. |
| 6,455,110 B1 | 9/2002 | Fortuyn et al. |
| 6,668,926 B2 | 12/2003 | Nguyen et al. |
| 6,716,484 B2 | 4/2004 | Brynolf et al. |
| 6,729,404 B2 | 5/2004 | Nguyen et al. |
| 6,776,362 B2 | 8/2004 | Kawamoto et al. |
| 6,962,200 B2 | 11/2005 | Nguyen et al. |
| 7,161,491 B2 | 1/2007 | Garcia et al. |
| 7,552,882 B2 | 6/2009 | Matsumoto et al. |
| 8,007,872 B2 | 8/2011 | Nakazono et al. |
| 2005/0244641 A1 | 11/2005 | Vincent |
| 2007/0114030 A1 | 5/2007 | Todd et al. |
| 2007/0254091 A1 | 11/2007 | Fredrickson et al. |
| 2008/0011477 A1 | 1/2008 | Rediger et al. |
| 2008/0213499 A1 | 9/2008 | Matsumoto et al. |
| 2010/0147515 A1* | 6/2010 | Hughes et al. ................ 166/271 |
| 2011/0118155 A1 | 5/2011 | Pisklak et al. |
| 2011/0311719 A1 | 12/2011 | Bicerano |
| 2012/0181020 A1 | 7/2012 | Barron et al. |
| 2013/0105154 A1* | 5/2013 | Vorderbruggen et al. .... 166/271 |

FOREIGN PATENT DOCUMENTS

| | | |
|---|---|---|
| EP | 1464789 | 10/2004 |
| WO | 2010070600 | 6/2010 |

OTHER PUBLICATIONS

International Search Report dated Oct. 28, 2013 for Application No. PCT/US2013/056574.
Written Opinion dated Oct. 28, 2013 for Application No. PCT/US2013/056574.

* cited by examiner

*Primary Examiner* — Angela M DiTrani
(74) *Attorney, Agent, or Firm* — Holly Soehnge; Baker Botts L.L.P.

(57) ABSTRACT

A method and apparatus for making up fracturing fluid with coated proppant applies opposed electrical charges to the proppant and its coating to create a uniform coating without extensive mechanical mixing, and additionally, the method applies opposed electrical charges to the coated proppant and fracturing fluid to enhance mixing.

15 Claims, 3 Drawing Sheets

ELECTROSTATIC PARTICULATE COATING METHODS AND APPARATUS FOR FRACTURING FLUIDS

CROSS REFERENCE TO RELATED APPLICATIONS

None.

BACKGROUND

1. Technical Field

The present inventions relate to methods and apparatus for making fracturing fluid containing coated particulate materials, such as proppants.

2. Background Art

Hydraulic fracturing is a common stimulation treatment. The purpose of a fracturing treatment is to provide an improved flow path for oil or gas to flow from the hydrocarbon-bearing formation to the wellbore. A treatment fluid adapted for this purpose is sometimes referred to as a "fracturing fluid." The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a "proppant."

A proppant is in the form of a solid particulate, which can be suspended in the fracturing fluid, carried downhole and deposited in the fracture to form a proppant pack. The proppant pack props the fracture in an open condition, while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

The proppant is selected to be an appropriate size to prop open the fracture and bridge the fracture width expected to be created by the fracturing conditions and the fracturing fluid. If the proppant is too large, it will not easily pass into a fracture and will screen out too early. If the proppant is too small, it will not provide the fluid conductivity to enhance production. See, for example, McGuire and Sikora, 1960. In the case of fracturing relatively permeable or even tight-gas reservoirs, a proppant pack should provide higher permeability than the matrix of the formation. In the case of fracturing, ultra-low permeable formations, such as shale formations, a proppant pack should provide for higher permeability than the naturally occurring fractures or other microfractures of the fracture complexity.

One common problem is that the proppant may not be sufficiently strong by itself to prop open a fracture. Crushing of proppant by fracture closure would generate fine particulates that migrate in the propped fracture, plug up pore spaces in the proppant pack, choking the flow path and decreasing well production. Proppant flowing back along with the production fluid often result in plugging or eroding of downhole equipment, such as electrical submersible pumps, or erosion of choke valves and other surface equipment. Another common problem is that the surface of the proppant may have an undesirable wettability characteristic for producing oil or gas from a particular subterranean formation. Another common problem is that, as the oil or gas moves through the subterranean formation, it can dislodge and carry particulate with the fluid into the wellbore. The migration of this particulate can plug pores in the formation or proppant pack, decreasing production, in addition to causing abrasive damage to wellbore pumps, tubing, and other equipment.

To help alleviate some of the common problems mentioned above, a resinous material can be coated on the proppant before the proppant is inserted in the formation. The term "coated" does not imply any particular degree of coverage on the proppant particulates, and the coverage can be partial or complete.

For example, some or all of the proppant can be coated with a curable resin. The curable resin can be allowed to cure on the proppant prior to the proppant being introduced into the well. The cured resin coating on the proppant provides a protective shell encapsulating the proppant and keeping the fine particulates in place, if the proppant were crushed or provides a different wettable surface than the proppant without the coating.

A curable resin coating on the proppant can be allowed to cure after the proppant is placed in the subterranean formation for the purpose of consolidating the proppant of a proppant pack to form a "proppant matrix." As used herein, "proppant matrix" means a closely associated group of proppant particles as a coherent mass of proppant. Typically, a cured resin consolidates the proppant pack into a hardened, permeable, coherent mass. After curing, the resin reinforces the strength of the proppant pack and reduces the flow back of proppant from the proppant pack relative to a similar proppant pack without such a cured resin coating.

A resin or curable resin can be selected from natural resins, synthetic resins, and any combination thereof in any proportion. Natural resins include, but are not limited to, shellac. Synthetic resins include, but are not limited to, epoxies, furans, phenolics, and furfuryl alcohols, and any combination thereof in any proportion. Examples of resins suitable for coating particulates are described in U.S. Pat. Nos. 6,668,926; 6,729,404; and 6,962,200. An example of a suitable commercially available resin is the EXPEDITE™ compound product sold by Halliburton Energy Services, Inc. of Duncan, Oklahoma.

By way of another example, some or all of the proppant can be coated with a tackifying agent, instead of, or in addition to, a curable resin. The tackifying agent acts to consolidate and helps hold together the proppant of a proppant pack to form a proppant matrix. Such a proppant matrix can be flexible rather than hard. The tackifying agent-coated proppant in the subterranean formation tends to cause small particulates, such as fines, to stick to the outside of the proppant. This helps prevent the fines from flowing with a fluid, which could potentially clog the openings to pores.

Tackifying agents include, but are not limited to: polyamides, polyesters, polyethers and polycarbamates, polycarbonates, and any combination thereof in any proportion. Examples of tackifying agents suitable for coating particulates are described in U.S. Pat. Nos. 5,853,048; 5,833,000;

5,582,249; 5,775,425; 5,787,986; and 7,131,491, the relevant disclosures of which are herein incorporated by reference. An example of a suitable commercially available tackifying agent is the SANDWEDGE™ product sold by Halliburton Energy Services, Inc. of Duncan, Oklahoma.

It is advantageous and common to coat proppant particles. The coated proppant particles are suspended in the fracturing fluid, preferably on the fly, and the resulting coated proppant particles are placed in one or more fractures formed in a subterranean zone. The term "on the fly" is used herein to mean that a flowing stream is continuously introduced into another flowing stream so that the streams are combined and mixed while continuing to flow as a single stream, as part of the on-going treatment. Coating the proppant particles with the hardenable resin or tackifying agents, and mixing the coated proppant particles with the fracturing fluid are preferably performed on the fly. Such mixing can also be described as "real-time mixing." As is well understood by those skilled in the art, such mixing may also be accomplished by batch or partial batch mixing.

Coating compounds are typically mixed with proppant in the blender's sand screws; indeed, a common way to perform mechanical mixing is in a mill. An example of an on-the-fly mixing method is described in U.S. Pat. No. 6,962,200 wherein, a container holds a liquid hardenable resin component, while another container holds a liquid hardening agent component. The liquid materials in the containers are transported to a static mixer. Control of the total and relative amounts of resin component and hardening agent component is achieved through the use of liquid additive pumps and flow meters. In a preferred embodiment, the flow meters are computer-controlled to ensure accurate metering, corresponding to the concentration of proppant and pumping rate of proppant slurry and to allow for a rapid shutdown of on-the-fly mixing when necessary.

A static mixer mixes the resin component and hardening agent component into a single, hardenable resin composition that is then transported through a conveyance means which is partially located inside a proppant hopper. The mixer can be any means known in the art for mixing two liquid streams. The conveyance means can be any means known in the art for conveying particulate material, for example, a proppant screw conveyor. The proppant may be transported to the hopper by any suitable means known in the art. The proppant is removed from a bulk container via conveyor belt, after which it enters the hopper. Inside the conveyance means the coating is mixed with the proppant to form coated proppant particles.

Where conveyance means is a sand screw, the coating is coated onto the proppant by the auger action of the sand screw itself. The coated proppant particles are transported by the sand screw to a blender tub. The coated proppant particles from the hopper may be transported to a blender tub by any means known in the art. In a preferred embodiment, the transport rate of coated proppant particles from sand hopper to blender tub is computer-controlled to ensure accurate metering and to allow for a rapid shutdown of on-the-fly mixing when necessary. Also transported to the blender tub is a fracturing fluid.

While these conventional methods of producing fracturing mixtures containing coated proppant have been successful, vigorous agitation and mixing must be performed in the blender and sand screw to ensure uniform coating of the abrasive proppant with viscous coatings. This results in wear and tear on the mixing equipment.

Problems associated with using sand screws for coating chemicals on proppant: 1) tackiness of coating chemicals tends to cause the sand screw to lock up during fracturing treatment with slow turning of the screw at low proppant concentrations, and 2) tackiness or curing of coating chemicals on sand screw requires its thorough cleaning to prevent it from locking up after each usage. The constant maintenance of sand screw requires time and resources.

Accordingly, there is a need for improved methods and apparatus for making mixtures of fracturing fluid with coated proppant therein.

SUMMARY OF THE INVENTIONS

The present inventions will allow formation of fracturing fluids containing proppants coated with materials, such as SANDWEDGE™ and EXPEDITE™ compounds, without the need to mix these compounds with the sand in a blender's sand screws. Not using the sand screws to mix EXPEDITE™ compound with sand will save on sand screw wear and clean up. Proppant delivery systems which do not use sand screws can be used to coat proppant with EXPEDITE™ compound and tackifying agents.

Dry proppant (sand) in motion can pick up a static electric charge, and this static electricity can have enough voltage to cause a spark which can ignite flammable compounds. Sand equipment and blenders are typically grounded together to prevent a large build up of static electricity. This invention would apply opposite electrical charges to the moving proppant and coating compound. For example, SANDWEDGE™ compound would be given a charge of opposite voltage to the sand voltage before it was mixed with the proppant falling vertically from a sand bin or from the sand screw on a blender to the mixing tub. The opposite charges of the proppant and SANDWEDGE™ compound would cause them to accelerate towards each other and bind together. The opposite charges would also force the SANDWEDGE™ compound to more evenly coat the proppant particle, rather than beading up on one side.

Where necessary, a power source could be used to increase the voltage differential between the proppant and coating compound.

The coating compound could be applied to the proppant after the proppant passed through the sand screws eliminating the need to clean up the sand screws to remove the coating compound at the end of the job.

Future blending systems which do not use sand screws will be able to use Sand Wedge® and Expedite® coated proppant.

The method and apparatus of the present invention could also be used to better combine sand and fracturing fluid in a blender by applying opposite electric charges to the sand and fracturing fluid. Less mechanical mixing would be necessary and air entrainment reduced.

BRIEF DESCRIPTION OF THE DRAWINGS

The drawing is incorporated into and forms a part of the specification to illustrate at least one embodiment and example of the present invention. Together with the written description, the drawing serves to explain the principles of the invention. The drawing is only for the purpose of illustrating at least one preferred example of at least one embodiment of the invention and is not to be construed as limiting the invention to only the illustrated and described example or examples. The various advantages and features of the various embodiments of the present invention will be apparent from a consideration of the drawing in which.

DETAILED DESCRIPTION

The present invention provides an improved apparatus and method for preparing proppant containing fracturing fluids. The present invention's particular applicability is to the coating of proppants, mixing proppant with fracturing fluids.

Figure 1:
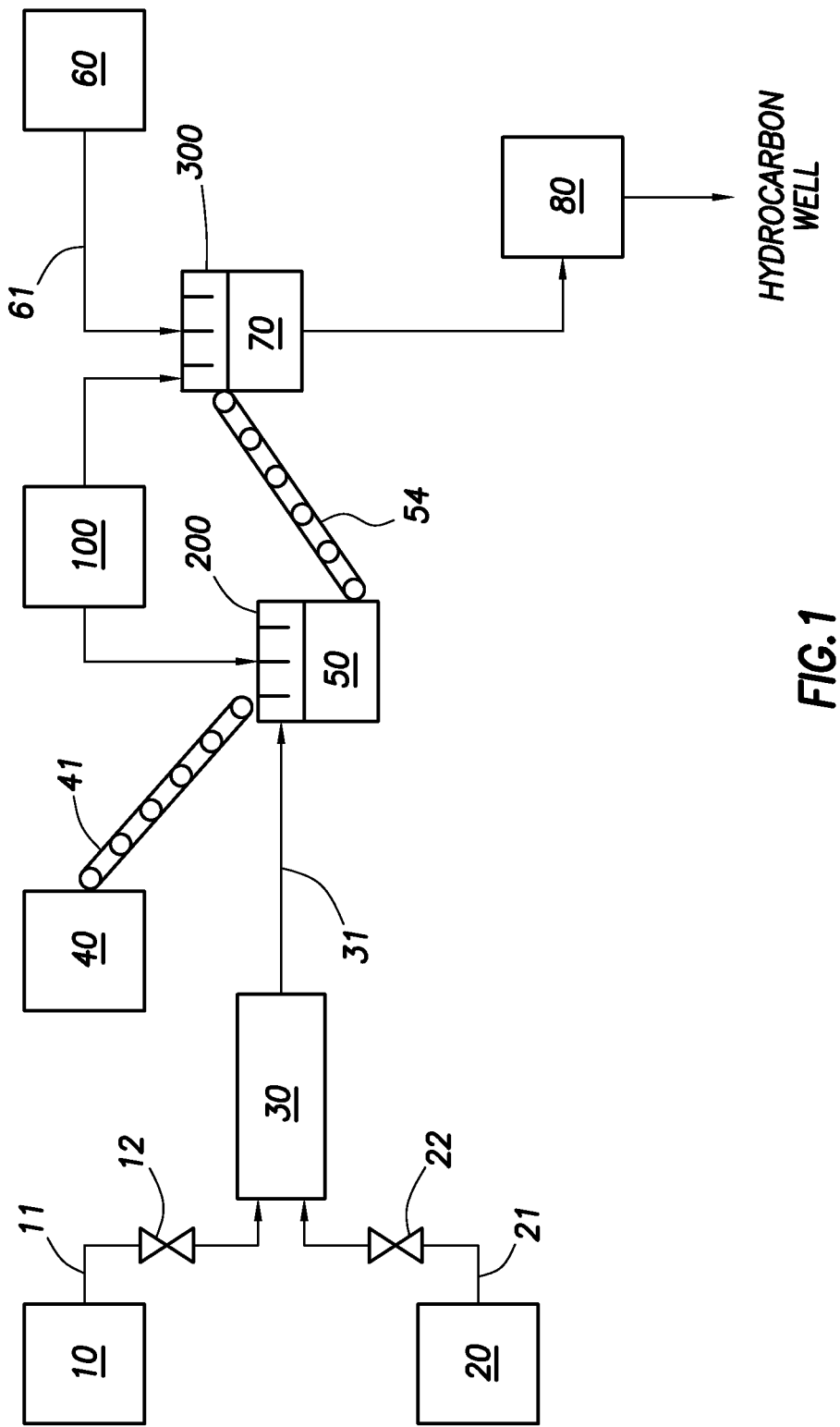
FIG. 1 is a schematic view of the fracturing fluid mixing system, including the electrostatic coating apparatus of the present invention.

Referring more particularly to the drawings, wherein like reference characters are used throughout the various figures to refer to like or corresponding parts, there is shown in FIG. 1 a diagram of one embodiment of the apparatus for preparing fracturing fluids containing coated proppant.

In accordance with one improved method and apparatus of this invention, proppant particles are coated with the hardenable resin composition, preferably on the fly, the coated proppant particles are suspended in the fracturing fluid, preferably on the fly, and the resulting hardenable resin composition-coated proppant particles are pumped into a well and placed in one or more fractures formed in a subterranean zone and then allowed to harden and consolidate into one or more high-strength permeable packs. Forming the hardenable resin composition, coating the proppant particles with the hardenable resin composition, and mixing the hardenable resin-coated proppant particles with the fracturing fluid are all preferably performed on the fly on an as-needed basis. However, the present inventions could be used to prepare batches of coated proppant and fracturing fluids.

In FIG. 1, container 10 holds a liquid hardenable resin component while container 20 holds a liquid hardening agent component. The liquid materials in containers 10 and 20 are transported to a static mixer 30 through lines 11 and 21, respectively. Control of the total and relative amounts of resin component and hardening agent component is achieved through the use of flow meter 12 on resin component line 11, and flow meter 22 on hardening agent component line 21. In a preferred embodiment, flow meters 12 and 22 are computer-monitored to provide precise control for the flow. Static mixer 30 mixes the resin and hardening agent into a single hardenable resin mixture that is to be used to coat proppant. Static mixer 30 can be any means known in the art for mixing two liquid streams, in one embodiment; mixer 30 may be a static mixer. The resin mixture is transported by line 31 to a sand hopper 50.

Proppant is stored in container 40 which is transported to a container known as a sand hopper 50 as needed by conveyor 41. Proppant from container 40 may be transported to sand hopper 50 by any suitable means known in the art. In one embodiment, the proppant is removed from container 40 via conveyor belt 41, after which it enters sand hopper 50 from the top.

Proppant entering the hopper is coated with the hardenable resin mixture, using the electrostatic mixer 200 located in the sand hopper. As will be described in detail in regard to FIG. 2, the mixer 200 is connected to an electrical power source 100 and applies opposing charges to the proppant and the hardenable resin mixture to enhance coating. In principal, as the proppant enters the hopper, it moves (drops or is propelled) past or into contact with a set of charged plates while the liquid hardenable resin mixture is sprayed onto the proppant from a nozzle with an applied voltage opposite to the plates. The opposed charges cause the coating to be attracted to the proppant.

The coated proppant is transported by conveyor 54 to a container called a "blender tub." The hardenable resin-coated proppant particles may be transported to blender tub 70 by any means known in the art. In a preferred embodiment, the transport of hardenable resin-coated proppant particles from sand hopper 50 to blender tub 70 is computer-controlled to ensure accurate metering and to allow for a rapid shutdown of on-the-fly mixing when necessary.

Also transported to blender tub 70 is a fracturing fluid from container 60. The fracturing fluid from container 60 may be transported to blender tub 70 by any means 61 known in the art. In a preferred embodiment, the transport of fracturing fluid from container 60 to blender tub 70 is computer-controlled to ensure accurate metering and to allow for a rapid shutdown of on-the-fly mixing when necessary.

Inside blender tub 70, the fracturing fluid is substantially mixed with hardenable resin-coated proppant particles to form a blended composition suitable for use in subterranean fractures in the present invention. In this embodiment, a second electrostatic mixer 300 is used to blend the fracturing fluid with the coated proppant. Mixer 300 is connected to the electrical power source 100. Mixer 300 applies opposite electrical charges to the coated proppant and fracturing fluid to assist in blending. The blended coated proppant containing fracturing fluid is pumped by pump 80 into a well to form fractures.

In the FIG. 1 embodiment, a curable resin coating can be used to form a protective shell to encapsulate the proppant. This provides a different wettable surface than the proppant without the coating. EXPEDITE™ compound can be used to coat the proppant. In another embodiment, a tackifying coating that acts to aggregate and helps hold together the proppant of a proppant pack to form a proppant matrix, such as SAND-WEDGE™ compound can be used.

Figure 2:
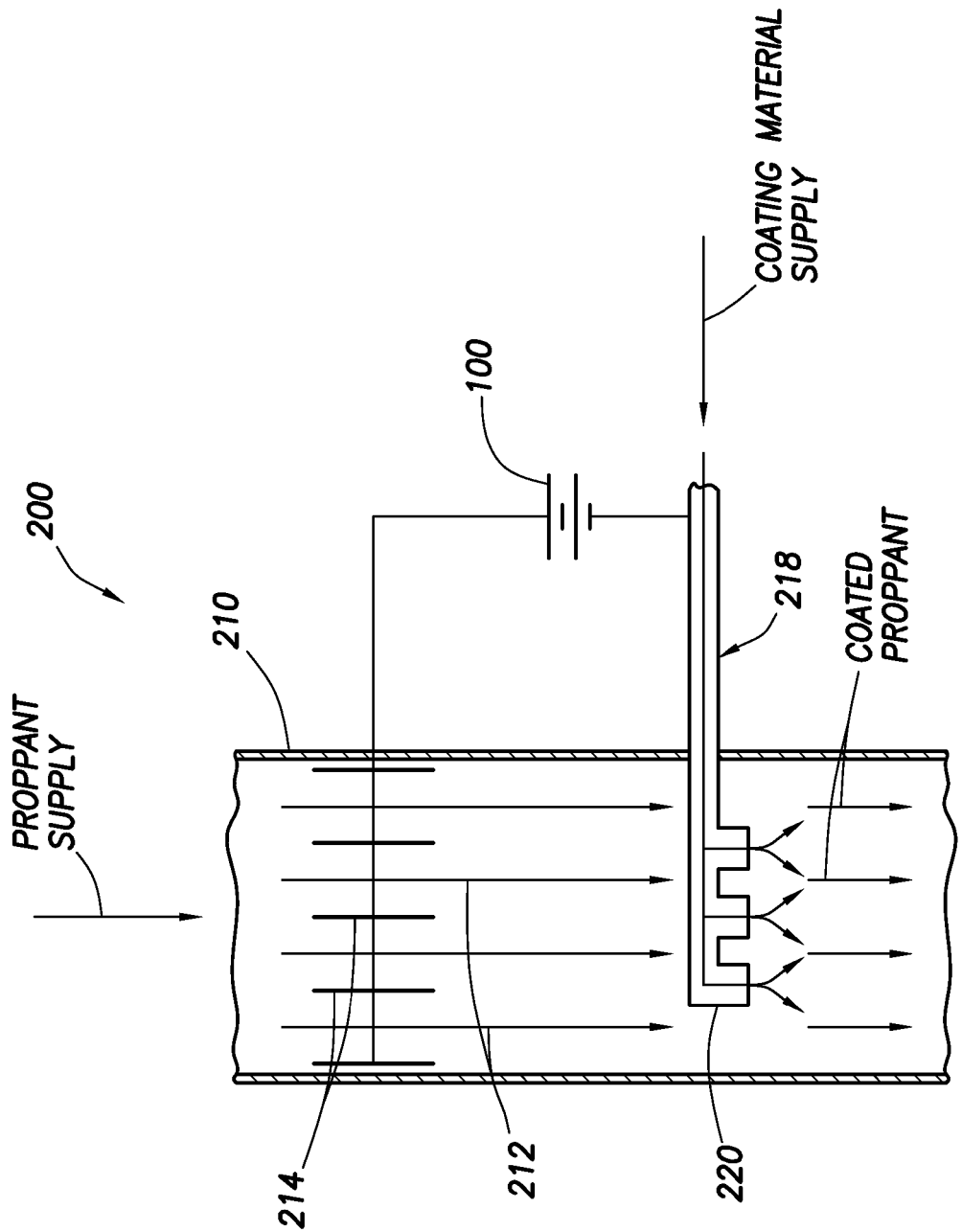
FIG. 2 is a schematic view of one embodiment of the electrostatic coating apparatus of the present invention.

Referring to FIG. 2, electrostatic mixer 200 of the present invention will be described in detail. The mixer 200 is located in a housing 210 and functions by applying an electrical charge to the proppant flowing into the hopper 50 and by applying an opposite charge to the coating material. Plates 214 apply an electrical charge to the proppant and a spray bar 218 applies an opposite charge to the coating material.

The housing or mixing tube 210 is located above or in the upper portion of the sand hopper 50. The cross section of the throat 212 of the tube 210 can be of any shape with the interior of the throat 212. Tube 210 can be constructed from non conductive materials or from materials with the interior surface (or throat) 212 coated with insulating (non-conductive) material. Alternatively, tube 210 can be mounted such that it is electrically insulated from the spray bar 218.

Preferably the proppant is delivered by the conveyor 41 to the housing 210 and moves or falls by the force of gravity past charged plates 214, located in the throat 212. In this figure, the top of the figure represents the upward direction. It is envisioned that other means of moving the proppant past the plates could be used, such as the proppant being propelled using a flowing gas, much like in sand blasting. In the present embodiment, the throat 212 has a cylindrical cross-section shape and plates 214 comprise a plurality of radially spaced concentric rings, however other plate shapes could be used. The plates are connected to and charged by an electrical power source 100. As the proppant particles move past or contact the plates a charge is applied to the proppant particles.

As illustrated, a spray bar 218 is located below and in the path of the proppant. The spray bar 218 has a plurality of nozzles for spraying coating material into the path of the proppant. The spray bar 218 is also connected to the electrical power source 100 and has an electric charge applied to it that is opposite from the charge applied to the plates 214. The opposed charges on the proppant and coating material passing the spray bar creates an electrical attraction between the proppant and coating which improves the coating process.

In a similar manner, the coated proppant leaving hopper 50 and entering blender tub 70, is charged in electrostatic mixer 300 while the fracturing fluids are sprayed through a spray bar with the opposite charge. The charged fracturing fluids will be attracted to the coated proppant and will tend to displace gases from the surface of the particles.

As used herein "spraying" includes atomizing the treatment fluid into fine droplets. The liquid is charged in the nozzles 220, such that, the liquid droplets exiting the nozzle are charged prior to contacting or "coating" the oppositely charged falling proppant. This coating process is performed without requiring physical mixing, augering or agitating the proppant and liquid mixture.

Figure 3:
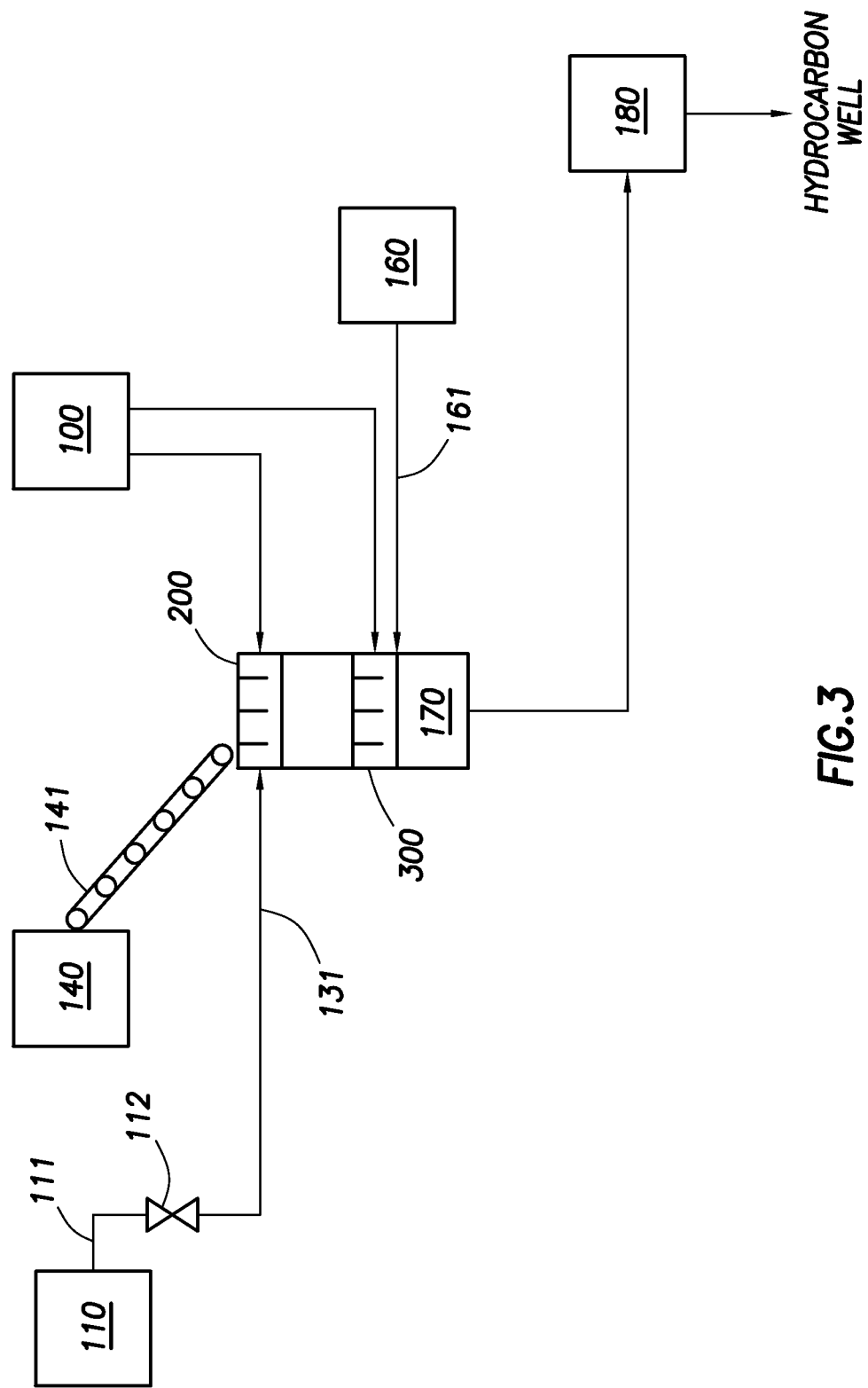
FIG. 3 is a schematic view, similar to FIG. 1, of an alternative embodiment of the fracturing fluid mixing system, including the electrostatic coating apparatus of the present invention.

In FIG. 1, the coating process and the mixing proppant with fracturing fluid are accomplished in two separate steps at two different locations. In an alternative embodiment, illustrated in FIG. 3, the coating-proppant electrostatic mixer 200 could be located in the blended tub 170 positioned above the proppant-fracturing fluid electrostatic mixer 300. Proppant would be fed from container 140 into the housing by conveyor 141 where it would fall through electrostatic mixer 200 and be coated with a tackifying fluid pumped from container 110 along lines 111 and 131 as controlled by flow meter 112. The opposed charges on the tackifying fluid and the proppant will cause the tackifying fluid and proppant to be attracted and bind together. The opposed charges will cause the tackifying fluid to more evenly coat the particles of the proppant rather than bead up on one or more sides. The coated proppant would be recharged as it enters (falls through) electrostatic mixer 300 and be mixed with the oppositely charged fracturing fluid entering the tub 170 via conduit 161 from container 160. Pump 180 pumps the blended fluid to a hydrocarbon well. In this alternative system, the process is simplified and unnecessary equipment is eliminated.

It is also envisioned that either of the electrostatic mixers could be eliminated, as required by the materials being used and the ease of coating and mixing. It is also envisioned that the embodiments of FIGS. 1 and 3 could alternatively be used to coat proppant with any materials, including tackifyers, resins and the like.

While compositions and methods are described in terms of "comprising," "containing," or "including" various components or steps, the compositions and methods also can "consist essentially of" or "consist of" the various components and steps. As used herein, the words "comprise," "have," "include," and all grammatical variations thereof are each intended to have an open, non-limiting meaning that does not exclude additional elements or steps.

Therefore, the present inventions are well adapted to carry out the objects and attain the ends and advantages mentioned as well as those which are inherent therein. While the invention has been depicted, described, and is defined by reference to exemplary embodiments of the inventions, such a reference does not imply a limitation on the inventions, and no such limitation is to be inferred. The inventions are capable of considerable modification, alteration, and equivalents in form and function, as will occur to those ordinarily skilled in the pertinent arts and having the benefit of this disclosure. The depicted and described embodiments of the inventions are exemplary only, and are not exhaustive of the scope of the inventions. Consequently, the inventions are intended to be limited only by the spirit and scope of the appended claims, giving full cognizance to equivalents in all respects.

Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of preparing a fluid for use in insertion into a subterranean hydrocarbon bearing wellbore, comprising the steps of:
   providing electrically-charged particulate material by moving proppant through an electric field;
   providing oppositely charged particulate coating fluid; and
   contacting the electrically charged particulate material with the oppositely charged particulate coating fluid to coat the electrically charged particulate material with the oppositely charged particulate coating fluid.

2. The method of claim 1, wherein providing the electrically-charged particulate material comprises providing electrically charged proppant.

3. The method of claim 1, wherein moving proppant through the electric field further comprises gravity feeding proppant past electrically-charged plates.

4. The method according to claim 1, wherein the step of providing oppositely charged particulate coating fluid comprises moving particulate coating fluid through an electrically-charged nozzle.

5. The method according to claim 1, wherein the step of providing oppositely charged particulate coating fluid step comprises providing a tackifying fluid.

6. The method according to claim 5, wherein the step of providing oppositely charged particulate coating fluid comprises moving tackifying fluid through an electrically-charged nozzle.

7. A method of forming a fracture from a hydrocarbon wellbore using coated proppant, the method comprising the steps of:
   providing proppant, proppant coating fluid, and fracturing fluid at a well location;
   at the well location, coating the proppant with the proppant coating fluid by electrically charging the proppant by moving the proppant through an electric field; electrically charging the coating fluid with a charge opposite to the charge of the charged proppant; and contacting the charged proppant with the oppositely-charged coating fluid to coat the proppant with the coating fluid;
   thereafter, at the well location, mixing the fracturing fluid with the coated proppant;
   pumping the mixture of fracturing fluid and coated proppant into the well; and
   forming a fracture at a subterranean location, extending from the wellbore.

8. The method according to claim 7, wherein the step of coating the proppant with the coating fluid at the well location further comprises: conveying proppant to a housing at the well location; feeding conveyed proppant into a housing; and electrically charging the proppant by moving the proppant through an electric field positioned in the housing.

9. The method according to claim 7, wherein the step of coating the proppant with the coating fluid at the well location comprises: conveying proppant to a housing at the well location; feeding conveyed proppant into a housing; and electrically charging the proppant by allowing the proppant to fall past electrically-charged plates located in the housing.

10. The method according to claim 7, wherein the step of providing oppositely charged proppant coating fluid comprises moving the proppant coating fluid through an electrically-charged nozzle.

11. The method according to claim 7, wherein the step of contacting the charged proppant with the oppositely charged proppant coating fluid comprises spraying the proppant coating fluid onto falling charged proppant.

12. The method according to claim 7, wherein the step of mixing the fracturing fluid with the coated proppant at the well location comprises applying an electrical charge to the fracturing fluid and an opposite electrical charge to the coated proppant.

13. The method according to claim 7, wherein the step of providing coating fluid at the well location comprises providing tackifying fluid.

14. A method of preparing a fluid for use in insertion into a subterranean hydrocarbon bearing wellbore, comprising the steps of:

providing electrically-charged particulate material by moving proppant through an electric field;

providing oppositely charged particulate coating fluid by moving particulate coating fluid through an electrically-charged nozzle; and contacting the electrically charged particulate material with the oppositely charged particulate coating fluid to coat the electrically charged particulate material with the oppositely charged particulate coating fluid.

15. The method according to claim 14, wherein moving proppant through an electric field further comprises gravity feeding proppant past electrically-charged plates.

* * * * *